Aug. 7, 1962 D. PAYNE ET AL 3,048,422
STEERABLE TRAILER
Filed Dec. 15, 1960 2 Sheets-Sheet 1

INVENTORS
Dick Payne &
BY George M. Amthor

Victor J. Evans & Co.
Attorneys

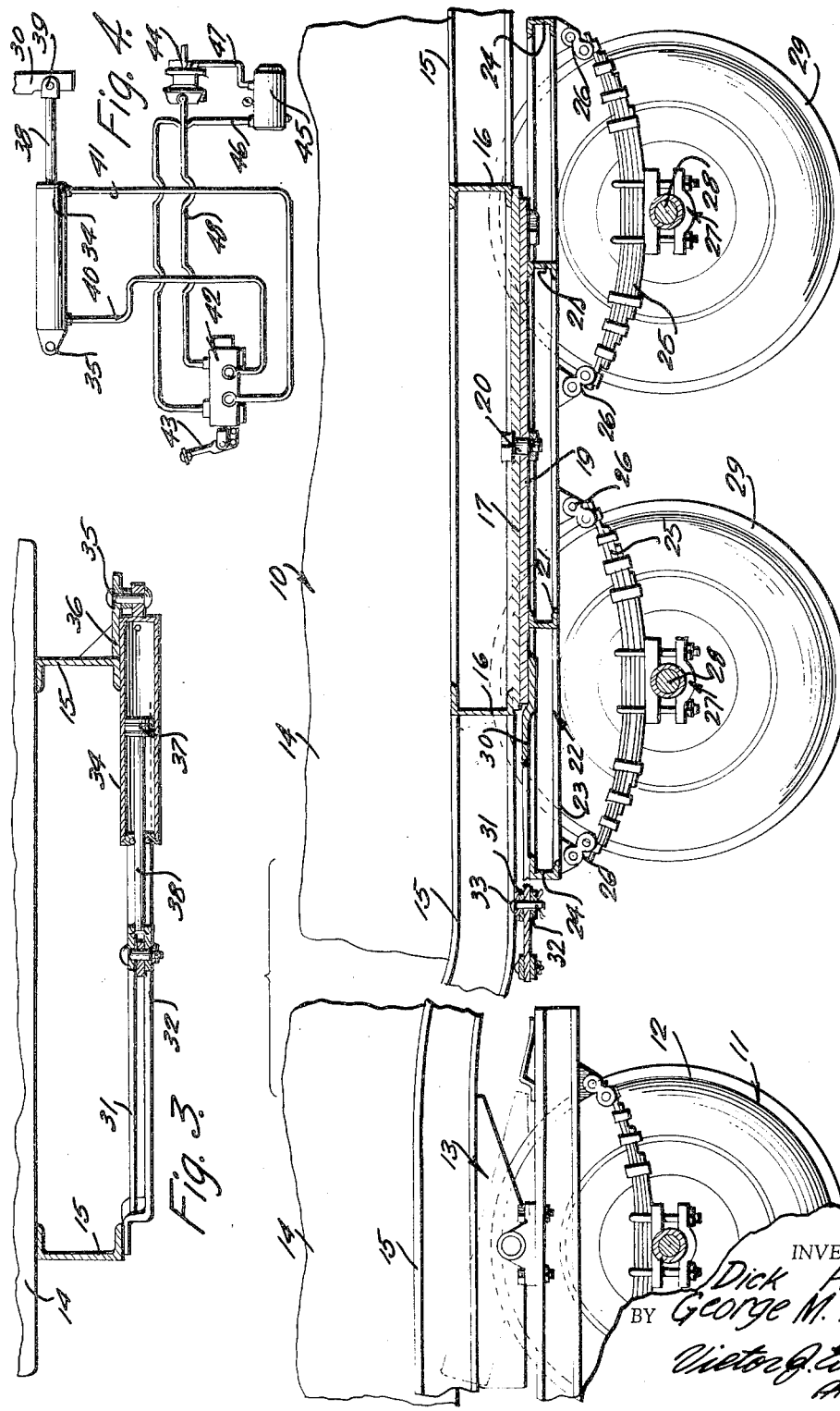

United States Patent Office 3,048,422
Patented Aug. 7, 1962

3,048,422
STEERABLE TRAILER
Dick Payne, Box 174, and George M. Amthor, Box 387, both of Gatesville, Tex.
Filed Dec. 15, 1960, Ser. No. 76,056
3 Claims. (Cl. 280—81.5)

This invention relates to a mobile unit such as a trailer, and more particularly to an improved steering means for the rear wheels of a trailer.

The primary object of this invention is to provide a means whereby the rear wheels or back axles of a trailer can be steered so that the trailer will have increased maneuverability as for example when the trailer is mounted behind a conventional towing unit such as a tractor.

A further object is to provide a steerable trailer which includes back axles that can be selectively turned or rotated as for example by means of a hydraulic mechanism which is under the convenient control of the operator or driver of the tractor so that the back wheels can be positioned at a desired location in order to permit the trailer to be handled with greater ease and flexibility, and wherein there is also provided a safety latching means for selectively retaining the back axles in a particular position so as to prevent accidental rotation or turning of the back axles and back wheels.

Still another object of the invention is to provide such a steerable trailer that is economical to manufacture and efficient in operation and which is rugged in structure and foolproof in use.

These and other objects of the invention will become apparent from a reading of the following specifications and claims, together with the accompanying drawings, wherein like parts are referred to and indicated by like reference characters and wherein:

FIGURE 2 is a sectional view taken on the line 2—2 of FIGURE 1.

FIGURE 3 is a sectional view taken on the line 3—3 of FIGURE 1.

FIGURE 4 is a schematic view illustrating the hydraulic mechanism for controlling the operation of the present invention.

Figures 1, 5:
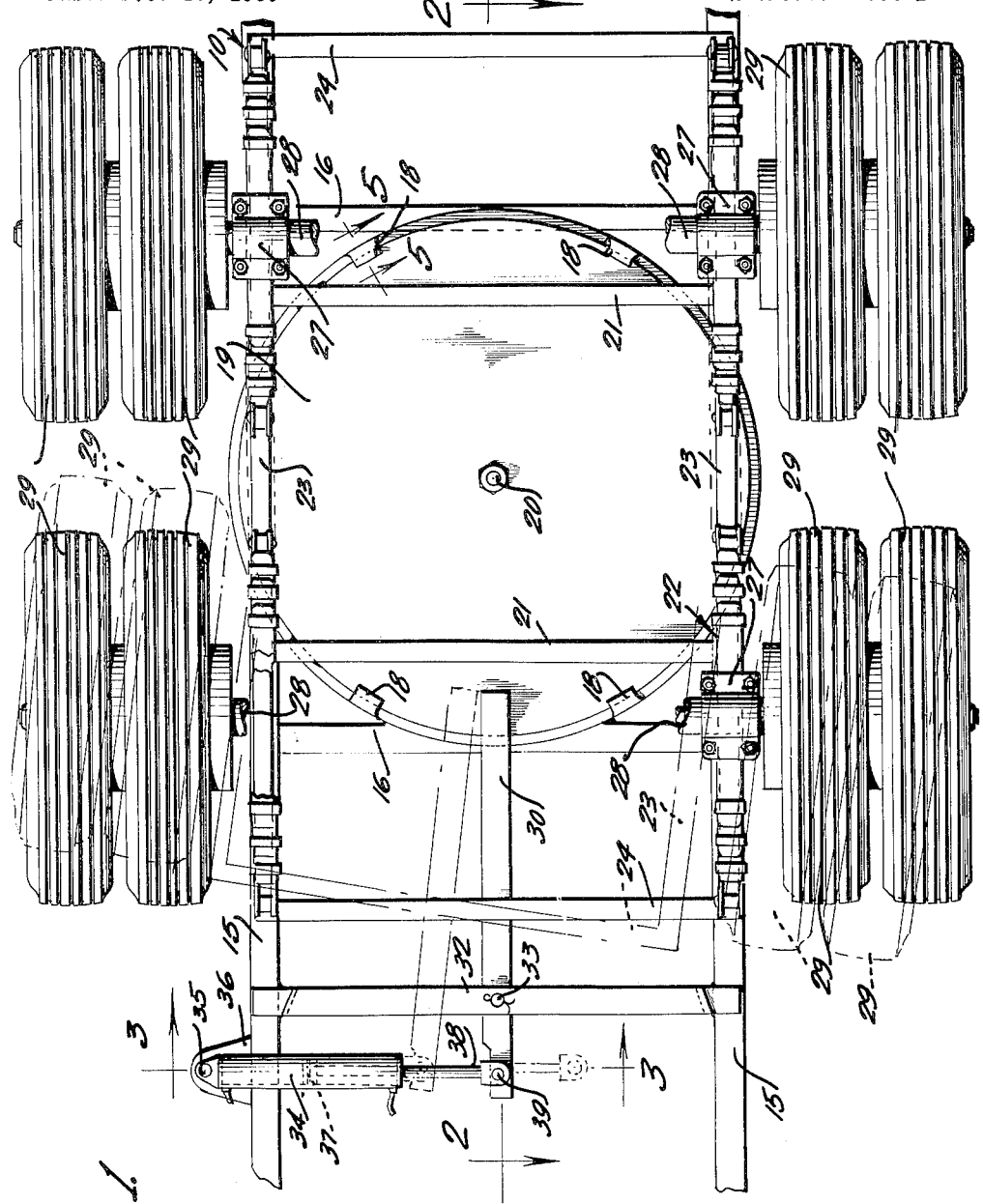
FIGURE 1 is a bottom plan view illustrating a portion of the steerable trailer of the present invention.
FIGURE 5 is a sectional view taken on the line 5—5 of FIGURE 1.

Referring in detail to the drawings, the numeral 10 indicates a portion of a trailer, while the numeral 11 indicates a portion of a conventional towing member such as a tractor, and the tractor 11 is provided with the usual ground engaging wheels 12, and the numeral 13 indicates a conventional fifth wheel assembly for connecting the front of the trailer 10 to the tractor 11.

As shown in the drawings, the trailer 10 includes a main body portion 14 of a suitable construction, and mounted below the main body portion 14 is a pair of longitudinally extending horizontally disposed spaced parallel beams 15, there being a pair of spaced parallel horizontally disposed cross pieces 16 extending between the beams 15, and the cross pieces 16 are secured to the beams 15 in any suitable manner, as for example by welding.

The numeral 17 indicates a horizontally disposed support member which is secured as by welding to the lower portions of the cross pieces 16, FIGURE 2, and depending from the outer portion of the support member 17 is a plurality of spaced apart guide lugs 18, FIGURE 5. The numeral 19 indicates a generally circular plate which is rotatably mounted below the support member 17, and the outer periphery of the plate 19 is guided and engaged by the lugs 18 whereby the plate 19 will be maintained in its proper position as it rotates or turns. The plate 19 is swivelly or rotatably connected to the support member 17 as for example by means of a pivot pin 20.

Arranged below the plate 19 and secured thereto as for example by welding is a pair of horizontally disposed spaced parallel braces 21, and the numeral 22 indicates a generally rectangular frame which embodies a pair of spaced parallel channel members 23, and the channel members 23 are secured in any suitable manner to the end portions of the braces 21. The frame 22 further includes a pair of spaced parallel end pieces 24, and the end pieces extend between the channel members 23 and are secured thereto as by welding.

The spring members 25 are mounted below the channel members 23 and are connected thereto as at 26, and bearing units 27 are connected to the springs 25. A pair of horizontally disposed spaced parallel back axles 28 are supported by the bearings 27, and rear wheels 29 are mounted on the back axles 28.

There is further provided a means for rotating the plate 19 whereby the back axles 28 and rear wheels 29 can be selectively turned or rotated so as to provide increased maneuverability for the trailer 10, and this means comprises a tongue 30 which has its rear end secured as by welding to the rotary plate 19. The tongue 30 is movably arranged between a pair of bars 31 and 32 which extend between the beams 15 and which are secured thereto in any suitable manner, FIGURE 3, and a safety latch or pin 33 is adapted to extend through registering apertures or openings in the bars 31 and 32 and in the tongue 30 so that for example the tongue 30 can be maintained stationary or immobile in the position such as that shown in solid lines of FIGURE 1, as for example when the trailer is being moved along a generally straight highway or the like.

A hydraulic means is provided for moving the tongue 30 so as to steer the trailer, and this hydraulic means embodies a cylinder 34 that is pivotally connected to a support piece 36 as at 35, FIGURE 3, and the support piece 36 may be suitably secured to or formed integral with one of the beams 15. A piston or plunger 37 is movably or slidably arranged in the cylinder 34, and a piston rod 38 is connected to the piston 37, the piston rod 38 being pivotally connected to the front end of the tongue 30 as at 39.

As shown in FIGURE 9, for example, conduits or hoses 40 and 41 are connected to opposite end portions of the cylinder 34, and the numeral 42 indicates a control valve for the hydraulic mechanism. A control lever 43 is adapted to be arranged in a convenient location such as adjacent the operator or driver of the tractor whereby the valve mechanism 42 can be readily controlled, and the numeral 44 indicates a conventional hydraulic pump which may be spaced from a hydraulic reservoir tank 45, and the tank 45 is adapted to have conduits or lines 46 and 47 connected thereto. The numeral 48 indicates a by-pass line or conduit which serves to connect the valve mechanism 42 to the pump 44, and the pump 44 is adapted to be used for circulating or pumping hydraulic fluid through the various conduits as later described in this application.

From the foregoing, it is apparent that there has been provided an improved steering mechanism for the rear wheels of a trailer such as the trailer 10, and with the parts arranged as shown in the drawings, it will be seen that the trailer 10 is adapted to be attached to a conventional tractor such as the tractor 11 through the medium of a fifth wheel assembly 13, and the fifth wheel assembly is of a conventional construction. The lever 43 is adapted to be arranged at a convenient location such as adjacent to the driver of the tractor, and when the back wheels 29 of the trailer 10 are to be turned as for example when the trailer is being backed up or otherwise maneuvered in a like manner, the lever 43 can be manually moved in order to adjust the valve mechanism 42 so that the pump 44 can circulate or pump the hydraulic fluid from the tank 45 through the conduits and into the cylinder 34 and this hydraulic fluid can be used to move the piston 37 in a desired direction in the cylinder. As the piston 37 moves in the cylinder 34, the rod 38 will likewise move, and since the rod 38 is connected as at 39 to the front end of the tongue 30, it will be seen that the tongue 30 can be moved, as for example from the solid line position of FIGURE 1 to the broken line position of FIGURE 1. It is to be understood that before the tongue 30 is moved, the latch pin 33 is first manually removed from the registering openings in the bars 31 and 32 and tongue 30, and as the tongue 30 is pivoted or moved by the hydraulic cylinder, it will be seen that the plate 19 will be rotated in view of the fact that the tongue 30 is secured as by welding to the plate 19. The plate 19 is swivelly connected to the support member 17 as at 20, and the lugs 18 help guide the plate 19 so as to maintain the plate 19 in its proper aligned position as it swivels or rotates relative to the stationary support member 17. The pair of braces 21 are secured to the rotary plate 19, and the channel members of the frame 22 are secured to the braces 21. Since the springs 25 are connected as at 26 to the channel members 23, and since the back axles 28 are journaled in the bearings 27 which are supported by the springs 25, it will be seen that as the plate 19 swivels on its pivot 20, the back axles 28 and rear wheels 29 can be turned or rotated as for example from the solid line position of FIGURE 1 to the broken line position of FIGURE 1 and this movement of the rear wheels 29 provides increased maneuverability for the trailer since by pivoting the back wheels the trailer can be guided as for example when the trailer is being backed up or otherwise maneuvered.

The valve 42 is of a construction so that by properly manually moving the lever 43, hydraulic fluid from the tank 45 can be pumped by the member 44 through the lines 40 and 41, and in addition there is provided a by-pass line 48 so that by properly setting the valve 42 by means of the lever 43 the hydraulic fluid can be recirculated or returned to the tank 45 or else it can be used to shift the piston 37 in either direction in the cylinder 34 in order to position the back wheels 29 at the desired location.

When the trailer is being moved along a highway or the like, in the usual manner behind a tractor 11, the pin 33 is adapted to be inserted through registering apertures in the bars 31 and 32 and tongue 30 whereby accidental shifting of the tongue 30 or back wheels 29 from their proper straight forward or aligned position will be prevented, so that the pin 33 functions as a safety mechanism.

The parts can be made of any suitable material and in different shapes or sizes.

The construction of the present invention is such that there are very few working parts and the present invention can be made inexpensively and can be economically and readily installed on existing equipment, or else it can be furnished as standard equipment on new trailers.

Some of the advantages of the present invention are as follows.

The back axles 28 of the trailer can be steered or turned so that the trailer can be steered when moving forward or rearward, and the lever 43 may be arranged at a convenient location such as adjacent the dash of the tractor. Power for operating the pump 44 may be supplied from the pulley on the front of the fan pulley on the truck or tractor, and the safety latch 33 functions as a safety device for highway travel.

Minor changes in shape, size and rearrangement of details coming within the field of invention claimed may be resorted to in actual practice, if desired.

What is claimed is:

1. A trailer comprising a main body portion, a pair of spaced parallel horizontally disposed longitudinally extending beams mounted below said main body portion, a pair of horizontally disposed spaced parallel cross pieces extending between said beams and secured thereto, a horizontally disposed support member secured to the lower portions of said cross pieces, spaced apart guide lugs depending from said support member, a horizontally disposed circular plate rotatably mounted below said support member and said plate being rotatable in said lugs; a pair of spaced parallel horizontally disposed braces secured to the lower surface of said plate, a rectangular frame including a pair of spaced parallel channel members secured to the ends of the braces, said frame further including a pair of spaced parallel end pieces extending between said channel members and secured thereto, spring members mounted below said channel members, bearings connected to said spring members, rear axles engaging said bearings, wheels connected to said axles, and means for selectively rotating said plate to turn said wheels.

2. A trailer comprising a main body portion, a pair of spaced parallel horizontally disposed longitudinally extending beams mounted below said main body portion, a pair of horizontally disposed spaced parallel cross pieces extending between said beams and secured thereto, a horizontally disposed support member secured to the lower portions of said cross pieces, spaced apart guide lugs depending from said support member, a horizontally disposed circular plate rotatably mounted below said support member and said plate being rotatable in said lugs; a pair of spaced parallel horizontally disposed braces secured to the lower surface of said plate, a rectangular frame including a pair of spaced parallel channel members secured to the ends of the braces, said frame further including a pair of spaced parallel end pieces extending between said channel members and secured thereto, spring members mounted below said channel members, bearings connected to said spring members, rear axles engaging said bearings, wheels connected to said axles, and means for selectively rotating said plate to turn said wheels, said last-named means comprising a tongue having one end affixed to said plate, bars extending between said beams and secured thereto, said tongue being movable between said bars, and hydraulic means for moving said tongue.

3. A trailer comprising a main body portion, a pair of spaced parallel horizontally disposed longitudinally extending beams mounted below said main body portion, a pair of horizontally disposed spaced parallel cross pieces extending between said beams and secured thereto, a horizontally disposed support member secured to the lower portions of said cross pieces, spaced apart guide lugs depending from said support member, a horizontally disposed circular plate rotatably mounted below said support member and said plate being rotatable in said lugs, a pair of spaced parallel horizontally disposed braces secured to the lower surface of said plate, a rectangular frame including a pair of spaced parallel channel members secured to the ends of the braces, said frame further including a pair of spaced parallel end pieces extending between said channel members and secured thereto, spring members mounted below said channel members, bearings connected to said spring members, rear axles engaging said bearings, wheels connected to said axles, and means for selectively rotating said plate to turn said wheels, said last-named means comprising a tongue having one end affixed to said plate, bars extending between said beams and secured thereto, said tongue being movable between said bars, and hydraulic means for moving said tongue, said hydraulic means comprising a cylinder having a piston movably mounted therein, a rod having one end connected to said piston and the other end connected to said tongue, and a safety latch adapted to selectively engage said tongue and bars.

References Cited in the file of this patent

UNITED STATES PATENTS

| | | |
|---|---|---|
| 2,166,308 | Logan | July 18, 1939 |
| 2,223,436 | Winn | Dec. 3, 1940 |
| 2,502,946 | Hart | Apr. 4, 1950 |
| 2,672,350 | Ott | Mar. 16, 1954 |
| 2,952,474 | Gouirand | Sept. 13, 1960 |
| 2,954,985 | Drong | Oct. 4, 1960 |
| 2,966,223 | Gleasman | Dec. 27, 1960 |